US006480802B1

(12) United States Patent
Flormann

(10) Patent No.: US 6,480,802 B1
(45) Date of Patent: Nov. 12, 2002

(54) METHOD FOR DETERMINING THE FLATNESS OF A MATERIAL STRIP

(75) Inventor: Paul Flormann, Heiligenhaus (DE)

(73) Assignee: IMS Messsysteme GmbH, Heiligenhaus (DE)

( * ) Notice: Subject to any disclaimer, the term of this patent is extended or adjusted under 35 U.S.C. 154(b) by 0 days.

(21) Appl. No.: 09/579,287

(22) Filed: May 25, 2000

(30) Foreign Application Priority Data

May 28, 1999 (DE) .......................................... 199 24 423
Oct. 1, 1999 (DE) .......................................... 199 47 572

(51) Int. Cl.$^7$ ............................................. G01B 11/24
(52) U.S. Cl. ...................................... 702/127; 702/172
(58) Field of Search ................................. 250/359, 560; 72/12.3; 73/67.7, 159, 862.07; 364/376, 508, 560; 702/121, 155, 167, 172

(56) References Cited

U.S. PATENT DOCUMENTS

| | | | |
|---|---|---|---|
| 3,577,773 A | * 5/1971 | Kubo et al. | 73/67.7 |
| 3,703,097 A | * 11/1972 | Kilpatrich et al. | 73/159 |
| 3,902,363 A | * 9/1975 | Ishimoto | 73/159 |
| 4,047,036 A | * 9/1977 | Smith et al. | 250/359 |
| 4,073,007 A | * 2/1978 | Boivin | 364/508 |
| 4,541,723 A | * 9/1985 | Pirlet | 356/376 |
| 4,752,695 A | * 6/1988 | Pirlet | 250/560 |
| 5,351,203 A | * 9/1994 | Hoffman et al. | 364/560 |
| 5,678,447 A | * 10/1997 | Graff | 73/159 |
| 6,164,104 A | * 10/2000 | Noe' et al. | 72/12.3 |
| 6,212,960 B1 | * 4/2001 | Durand-Texte et al. | 73/862.07 |

OTHER PUBLICATIONS

Cser, L; Korhonen, A S; Gulyas, J; Mantyla, P; Simula, O; Reiss, G; Ruha, p; "Data Mining And State Monitoring in Hot Rolling"; Proceedings of the Second Intn'l Conf on Intelligent Processing and Manufacturing of Materials; vol. 1, 1999; pp. 529–536.*

Yang Xilin; Qiu Zhongyi; Yu Changyou; Jin Guofan; "Study On Laser Measurement System For Hot–Rolling Strip Steel"; Proceedings of the 37$^{th}$ SICE Annual Conference International Session Papers; 1998; pp 911–914.*

U.S. patent application Ser. No. 09/688,620, Flormann.

* cited by examiner

Primary Examiner—John S. Hilten
Assistant Examiner—Douglas N Washburn
(74) Attorney, Agent, or Firm—Frishauf, Holtz, Goodman & Chick, P.C.

(57) ABSTRACT

A method for determining the flatness of a material strip and a device for performing the method. The method and device solve the technical problem of calculating the strip elongation from values of the strip contour and thus determining the flatness of the material strip. This problem is solved according to the present invention by a method in which, from the changes of slope values measured at a plurality of measurement points, the wavelength and phase of these changes are calculated. Therefrom there is calculated the position of at least one extremum, at which the measured slope values have only a transverse component. The slopes are summed to calculate a contour, from which the amplitude is calculated. The strip elongation as a measure of the flatness of the material strip is then determined from the wavelength and amplitude.

12 Claims, 5 Drawing Sheets

METHOD FOR DETERMINING THE FLATNESS OF A MATERIAL STRIP

BACKGROUND OF THE INVENTION

1. Field of the Invention

The present invention relates to a method for determining the flatness of a material strip, as well as to a device for performing the method.

2. Background Information

Undesired unevennesses extending in travel in the longitudinal direction, as well as in the transverse direction thereto are formed in a metal sheet produced in the form of a material strip during the cold and hot rolling of metal sheets. These unevennesses cause the material strip to be deflected to various extents perpendicular to the surface, thus spoiling the flatness, and leading to different strip elongations for several longitudinal portions of the material strip which are disposed transverse to the longitudinal direction. It is therefore necessary during the rolling of a metal sheet to monitor the flatness of the produced material strip and, if deviations from flatness are detected, to influence the conditions of the rolling process.

The value of strip elongation is measured in "I" units, where one I units means a relative length change of $10^{-5}$, which corresponds, for example, to 10 μm per meter.

Several methods for measuring flatness are known.

A first method comprises scanning the surface of the material strip by means of a pulsed laser beam, with which a grid of points and their associated distance from the laser light source is recorded. The results are used to determine the deflection of the material strip and thus the flatness.

In a second method, a geometric pattern such as a striated pattern is projected onto the surface by means of an optical imaging device. This pattern is monitored by a camera. Surface deflections distort the pattern, and the magnitude of the distortion provides a measure of the flatness.

The two methods described in the foregoing work on contactless principles, and so they are used preferably in the hot-rolling process. The ambient conditions, however, necessitate frequent maintenance of the optical components, especially during hot rolling. In both methods, moreover, a measuring device must be set-up in addition to the devices normally used for measurement of strip thickness profiles. These devices usually operate with high-energy electromagnetic radiation.

A third method uses a plurality of pressure sensors, which are disposed side-by side, roll along with the material strip and are in contact with the material strip. Different deflections lead to different pressures, and so the measured pressures can be evaluated as a measure of flatness. The disadvantage of this method lies in the mechanical contact of the individual pressure sensors with the material strip, and so, especially in the case of the hot-rolling process, the method cannot be used because of the high temperatures. Even in cold rolling, however, the method suffers from the disadvantage that the mechanical contact leads to wear.

Finally, methods and devices are known that use high-energy electromagnetic radiation such as X-rays or gamma rays to measure strip thickness transverse profiles, as well as the strip contour, or in other words, the shape and position of the material strip over the width. Using this measuring method, however, it has not yet been possible to determine the flatness of the material strip.

SUMMARY OF THE INVENTION

It is emphasized that unevennesses which can also be measured by means of the method describe hereinafter can occur not only in material strip produced from metal sheets, but also in material strips from other materials. Thus the term material strip, rather than metal strip is used in general hereinafter.

The technical problem underlying the present invention is to specify a method and a device for determining the flatness of a material strip, in which device and method the strip elongation is calculated from the values of strip contour.

The present invention thus concerns a method for determining the flatness of a material strip, the material strip predefining a longitudinal direction, comprising:

recording measured values at a plurality of measurement points by at least two radiation sources and a plurality of detectors, the measurement points being disposed transverse to the material of the strip and being sensed by at least two detectors, each of which detects radiation at various solid angles, moving the material strip in the longitudinal direction relative to the radiation sources and the detectors, and rows of measured values substantially encompassing all measurement points are recorded at each of several given intervals, calculating the slope of the material strip for each recorded measurement point from the measured values of the detector pairs, calculating the wavelength and phase of slope changes for successive rows of measured values at a known relative velocity in the longitudinal direction, calculating at least one extremum and the respective associated closest row of extreme measured values from the wavelength and phase, calculating the transverse contour by summing the slope values of the rows of extreme measured values, and then determining the amplitude of the transverse contour, and calculating the strip elongation from the wavelength and amplitude of the contour.

The present invention also relates to a device for determining the flatness of a material strip, the material strip predefining a longitudinal direction, comprising:

at least two radiation sources, which are disposed transverse to the longitudinal direction and spaced apart from each other;

a plurality of detectors, which are disposed transverse to the longitudinal direction at a distance from each other and from the radiation source, the material strip being disposed between the radiation sources and the detectors, each of at least two detectors being oriented towards two different radiation sources and forming a detector pair or pairs, and axes formed respectively by a detector together with a radiation source intersecting each other substantially in the region of the material strip and thus predefining measurement points; and means for evaluation of measured values which are recorded by the detectors, the evaluation means calculate from the measured values the slope of the material strip at the measurement points and therefrom the flatness of the material strip.

The technical problem described in the foregoing is solved by the method according to the present invention, wherein measured values are first recorded at a plurality of measurement points by means of at least two radiation sources and a plurality of detectors. The said measurement points are disposed such that they lie transverse to the longitudinal direction and spaced apart from each other in the material of the strip.

The measurement points are sensed individually by at least two detectors, each of which detects radiation at various solid angles. At any time, therefore, one detector is oriented towards one of the at least two radiation sources and the other detector is oriented towards the other radiation source. Thus those volume elements of the material strip through which there passes the radiation sensed by the detectors can be regarded as the measurement points.

Furthermore, the material strip is moved in the longitudinal direction relative to the radiation sources and the detectors. Rows of measured values substantially encompassing all measurement points are recorded at each of several given intervals. The slope of the material strip is then calculated for each recorded measurement point from the measured values of the detector pairs. Thus there is obtained a grid of measured values and associated slope values extending over a given region of the material strip.

Knowing the velocity of the material strip in the longitudinal direction relative to the radiation sources and detectors, it is then possible to calculate, for successive rows of measured values, the wavelength and phase of the slope changes, which changes characterize the flatness. In this context, the wavelength is to be understood as the distance between each of two successive regions with the same deflection up or down.

Furthermore, there is calculated from the wavelength and phase at least one extremum, for which it is true that the magnitude of the slope component in the longitudinal direction is minimal. This ensures that the slope values have substantially only a transverse component, which characterizes the deflection of the material strip in the transverse direction; this deflection being responsible for the strip elongation.

At each extremum there is calculated a row of extreme measured values, which in each case represents the row of measured values located closest to the extremum, since the rows of measured values are distributed discretely and not continuously over the material strip. In this way there is obtained the most accurate possible approach to the extremum, and the row of extreme measured values contains the information necessary for determination of the transverse contour.

The transverse contour is calculated by summing the slope values of the row of extreme measured values, and the amplitude of the unevennesses at the extremum is determined for each measurement point from the transverse contour. Finally the strip elongation is calculated from the wavelength and the amplitude of the transverse contour. In fact, a strip elongation can be calculated for each length element of the material strip containing a succession of corresponding measurement points in the longitudinal direction.

According to the present invention, therefore, it has been recognized that the unevennesses in the material strip can be determined across and along the material strip on the basis of the variable absorptions of radiation. Furthermore, the components in the longitudinal direction and in the transverse direction thereto, contained in the respective slope values, are advantageously evaluated independently of each other.

Preferably the radiation intensity attenuated by the material strip is measured by the detectors. In this case the degree of attenuation is a measure of the thickness of the material strip through which the radiation has passed.

It is further preferred that the measurement points cover substantially the entire width of the material strip. Thereby it is possible to examine the entire width of the material strip with one row of measured values. Reciprocating linear movement of the radiation sources and detectors transverse to the longitudinal direction is then unnecessary, although the number of detectors is relatively large.

The accuracy of the method can be further improved by additionally moving the detectors forward and back across the material strip through an amplitude in the range of the distance between two detectors while the material strip is moving in the longitudinal direction. Thereby the regions between each two detectors can also be sensed, and so regions of the material strip that would otherwise not be sensed can be sensed.

Furthermore, the measurement points can be combined in measuring channels, each of at least two measurement points. Preferably the measuring channels each encompass substantially the same number of measurement points, and the values of the slopes are calculated for each measuring channel. It is further preferable to calculate the strip elongation separately for each measuring channel. Thereby the information of neighboring measurement points is combined, thus achieving an improved signal-to-noise ratio. It is also possible to combine all measurement points in one measuring channel or halves of the measurement points in each of two measuring channels. The size of the measuring channels can be adjusted as a function of the quality of the measured values.

In a further preferred embodiment the wavelength and phase of the unevennesses are calculated by means of a Fourier transform. It is also possible, however, to use other mathematical methods with which wavelength and phase of the unevennesses can be calculated.

As explained hereinabove, a row of extreme measured values is determined for each extremum. Preferably the strip contour in the region of the extremum is calculated from the data of the row of extreme measured values and of at least one further adjacently disposed row of measured values by arithmetic averaging. Thereby the signal-to-noise ratio is also improved. In particular, those two rows of measured values between which the calculated extremum lies are used for evaluation.

Furthermore, the strip elongation is preferably calculated in I units by means of the formula $$\left(\frac{\text{Amplitude} \cdot \pi}{\text{Wavelength}}\right)^2 \cdot 10^5,$$

wherein the amplitude and the wavelength are in units of meters. For this purpose it is assumed that the unevennesses of the material strip are sinusoidal. This calculation can also be simplified by using a triangular form as an approximation, so that the strip elongation can be determined by a simple geometric calculation.

In the course of the method, a plurality of rows of measured values is needed in order to determine the wavelength and phase of the unevennesses. It is therefore possible to record rows of measured values for a given first strip length at the beginning of the measurement (at a starting period of time for measuring so as to sample enough data to be able to carry out the method), and then to evaluate these rows for a first time. Thereafter, or in other words, after the first given strip length, the measured values for a smaller, second given strip length are recorded, and then the measured values most recently recorded over an entire first strip length are evaluated, and so on. In other words, rows of measured values collected over a portion corresponding to the first strip length are always evaluated for determination of the strip length.

For example, measured values at intervals of 10 cm each are first recorded over a strip length of 10 meters. Thus initial evaluation results are obtained after the first 10 meters. Thereafter a further 2 meters of strip length are surveyed and the most recently measured 10 meters are evaluated. Thereby a moving average is obtained within the evaluation results.

The technical problem described above is solved also by the use of the device according to the present invention for measurement of the strip thickness profile of a material strip in order to determine the flatness. This device is provided with at least two radiation sources, a plurality of detectors and means for evaluation of the measured values recorded by the detectors. The detectors are disposed at a distance from each other and from the radiation sources, the material strip being disposed between the radiation sources and the detectors and moved in the longitudinal direction relative thereto. The detectors generate measured values at the measurement points disposed in the material strip, and the evaluation means calculate from the measured values the slopes at the measurement points and therefrom the strip flatness.

Thus it is possible for the first time to use, for measurement and checking of the flatness of the material strip as well, a device that heretofore has existed exclusively for measurement of the strip thickness profile. The technical complexity is therefore considerably reduced on the whole, since none of the separate devices necessary for performing the aforesaid methods known from the prior art are needed. Since the determination of flatness can be achieved with an already existing device for measuring the strip thickness profile of a material strip, the present invention can also be used for retrofitting existing devices, because the method according to the present invention represents substantially a detailed analysis of the measured values obtained heretofore.

A practical example of the present invention is depicted in more detail hereinafter with reference to the drawings.

BRIEF DESCRIPTION OF THE DRAWINGS

For the purposes of illustrating the present invention there is shown in the drawings forms which are presently preferred. It is to be understood, however, that the present invention is not limited to the precise arrangements and instrumentalities depicted in the drawings.

DETAILED DESCRIPTION OF THE INVENTION

Figure 1:
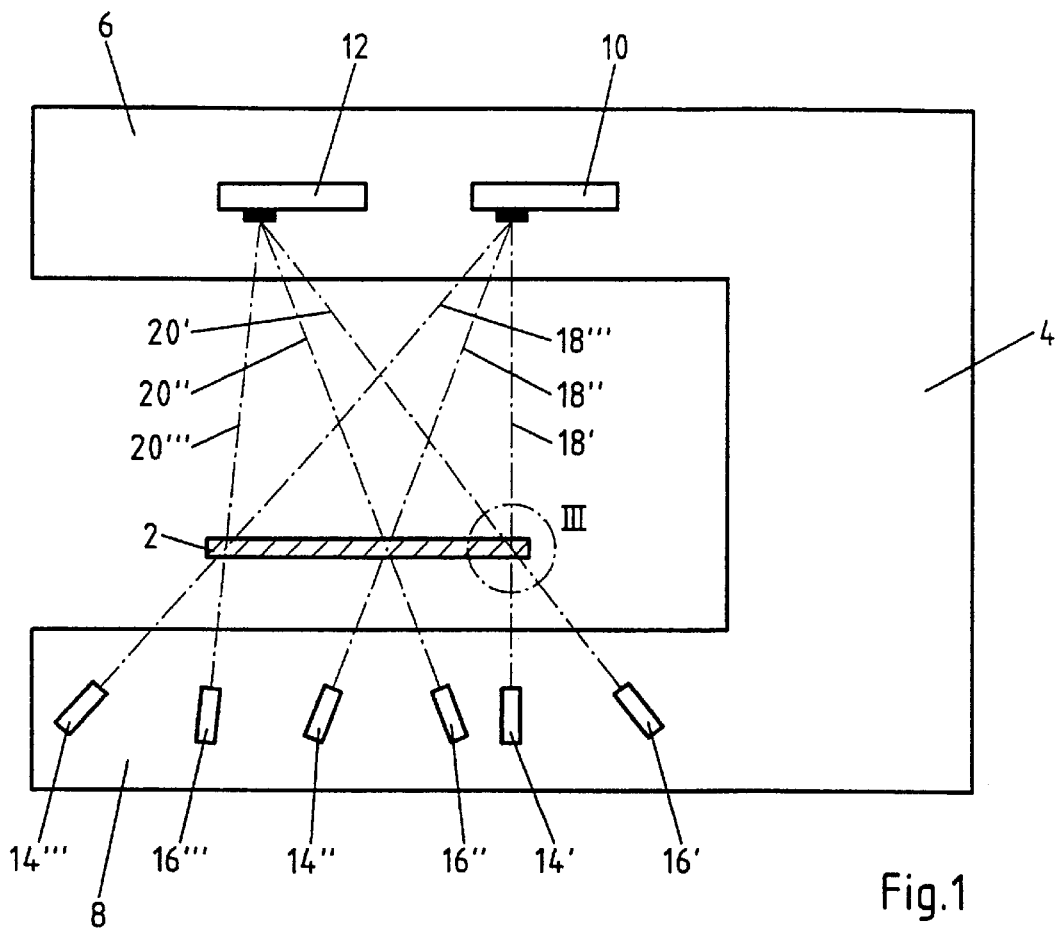
FIG. 1 is a schematic diagram which shows a device for performing the method according to the present invention in a side view in the longitudinal direction.
Figure 2:
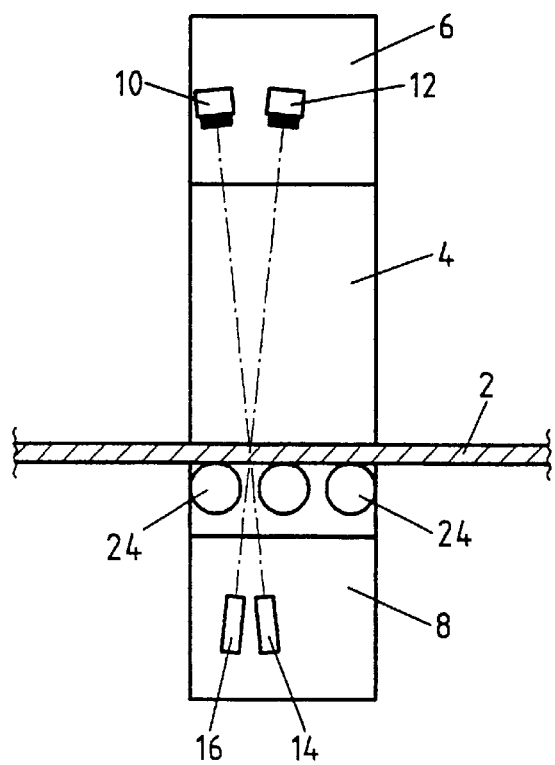
FIG. 2 is a schematic diagram which shows the device according to FIG. 1 in a side view transverse to the longitudinal direction.

FIGS. 1 and 2 show a device according to the present invention for determination of the flatness of a material strip 2. The device comprises a C-shaped housing 4 provided with an upper leg 6 and a lower leg 8. In upper leg 6 there are disposed two radiation sources 10 and 12, which are spaced apart from each other transverse to the longitudinal direction of the material strip. The longitudinal direction is perpendicular to the drawing plane in FIG. 1 and is horizontal in FIG. 2.

In the present case, radiation sources 10 and 12 are designed as X-ray sources, and they emit X-rays at a given angle toward lower leg 8. It is also possible, however, for other high-energy electromagnetic radiation, especially gamma rays, to be emitted.

A plurality of detectors 14 (14', 14", 14''') and 16 (16', 16", 16''') are disposed in lower leg 8 transverse to the longitudinal direction and are spaced apart from each other, as well as from radiation sources 10 and 12. Each set of detectors 14'–16', 14"–16", 14'''–16''' are then oriented towards the two different radiation sources 10 and 12, thus forming detector pairs.

In a further practical example, not illustrated in the drawings, three detectors are used for recording measured values at one measurement point. Thus greater redundancy is achieved in the determination of the slope.

In the present case, detectors 14 (14', 14", 14''') and 16 (16', 16", 16''') are ionization chambers, but they can also have the form, for example, of scintillation counters, counting tubes or solid-state detectors. They measure the intensity of the radiation passing through the material strip, this intensity representing a measure of the length of the path traveled by the radiation through the material strip.

Material strip 2 is disposed between upper leg 6 containing radiation sources 10 and 12 and lower leg 8 containing detectors 14 (14', 14", 14''') and 16 (16', 16", 16'''). Thus axes 18', 18", 18''' are formed by the detectors 14', 14" and 14''' together with radiation source 10; and axes 20', 20" and 20''' are formed by detectors 16', 16" and 16''' together with radiation source 12. The axes 18', 18" and 18''' and the axes 20', 20" and 20''' intersect each other substantially in the region of material strip 2, thus defining a measurement point 22 for each detector pair 14'–16', 14"–16", 14'''–16'''. The two detectors of a detector pair 14'–16', 14"–16", 14'''–16''' thus cover different solid angles. This is illustrated in an enlarged detail in FIG. 3.

As is shown in FIG. 2, rolls 24 which supports the traveling material strip are provided in the region of housing 4.

Furthermore the device is provided with means (not illustrated in the drawings) for evaluation of the measured values recorded by detectors 14 (14', 14", 14''') and 16 (16', 16", 16'''), which evaluation means, which preferably are provided with at least one computer, calculate from the measured values the slope of material strip 2 at measurement points 22, and therefrom the flatness of material strip 2, as will be described hereinafter.

In the device shown in FIGS. 1 and 2, detectors 14 (14', 14", 14''') and 16 (16', 16", 16''') are distributed substantially over the entire width of material strip 2. Thus the entire width of material strip 2 is covered by the evaluation of the measured values of all detectors.

The accuracy of the method can be improved, however, by additionally moving detectors 14 (14', 14", 14''') and 16 (16', 16", 16''') forward and back across material strip 2 while the material strip is moving in the longitudinal direction, for which purpose there are provided drive means not illustrated in the drawing. The amplitude of the forward and back motion lies within the range of the distance between two detectors 14 (14', 14", 14'") and 16 (16', 16", 16'") transverse to the longitudinal direction of material strip 2. Thereby regions between each two detectors 14 (14', 14", 14'") and 16 (16', 16", 16'") that would otherwise not be sensed can also be sensed.

In another embodiment, which is not illustrated in the drawings, detectors 14 (14', 14", 14'") and 16 (16', 16", 16'") cover only part of the width of material strip 2. In this case, drive means are provided for positioning radiation sources 10 and 12, as well as detectors 14 (14', 14", 14'") and 16 (16', 16", 16'") and thus housing 4, which drive means affect positioning substantially transverse to the longitudinal direction during a series of measurements. Thus the entire width of the material strip is covered with a smaller number of detectors 14 (14', 14", 14'") and 16 (16', 16", 16'"), although additional complexity for transverse positioning must be tolerated.

The means for evaluation of the measured values recorded by detectors 14 (14', 14", 14'") and 16 (16', 16", 16'") are formed as a plurality of computers, one computer or a group of computers calculating the respective variables such as strip thickness, strip width, strip contour and flatness. Thereby simultaneous evaluation is achieved with high speed.

Figure 4:
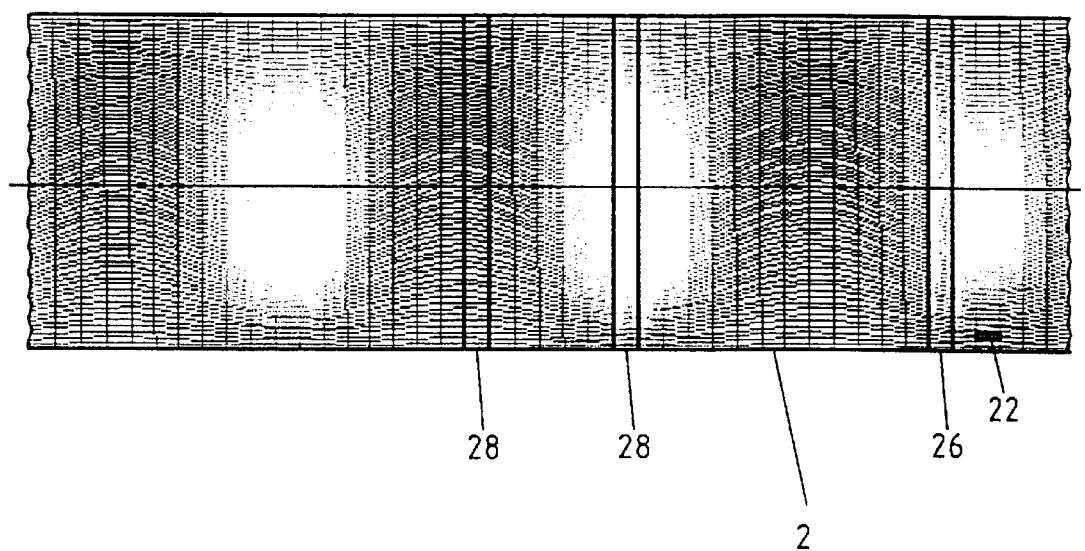
FIG. 4 is a two-dimensional graphic representation of the flatness of a material strip.
Figure 6:
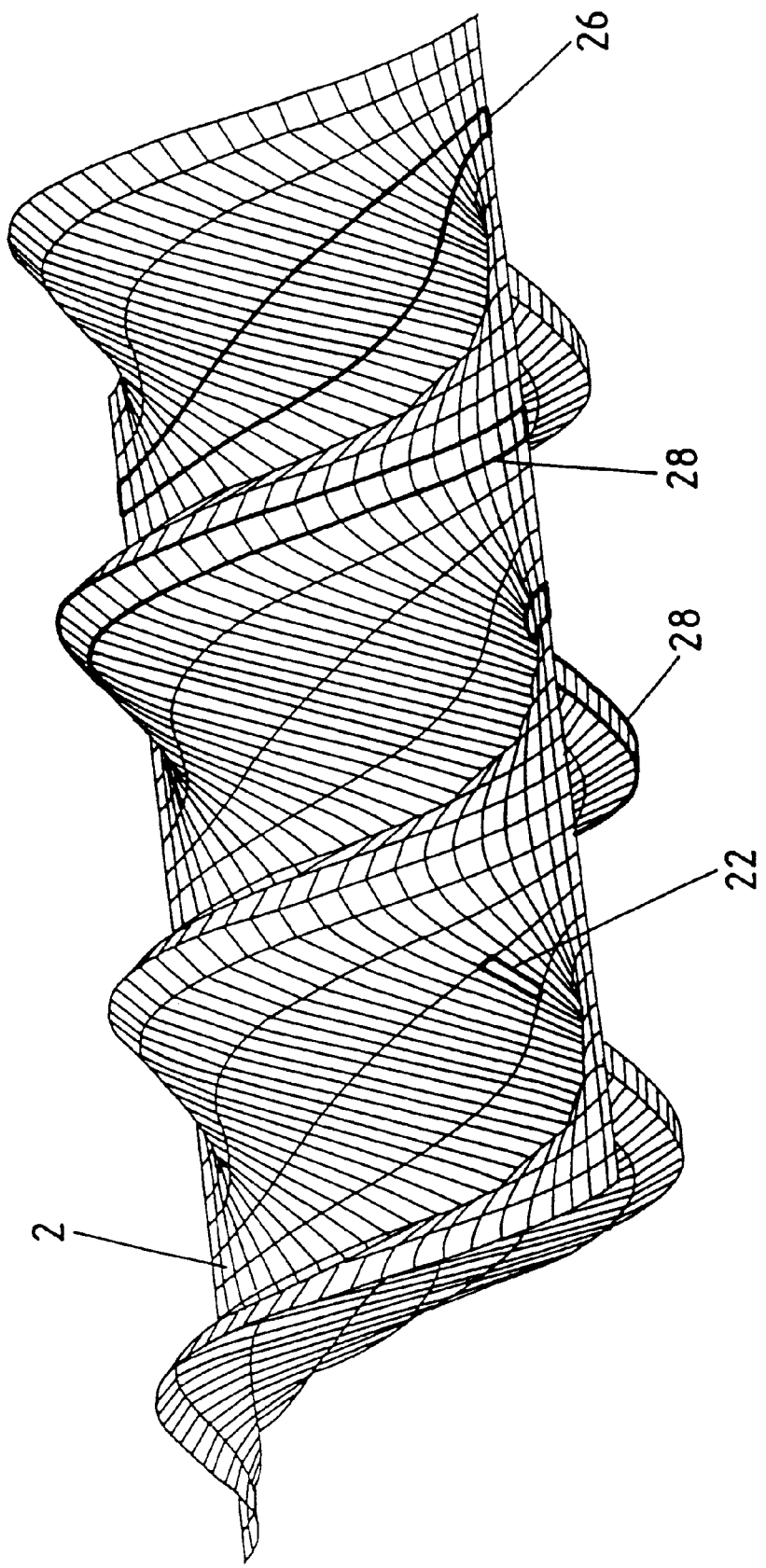
FIG. 6 is a three-dimensional representation of the flatness of a material strip, where the amplitudes of the extrema are greatly exaggerated for the purposes of illustration.

The method according to the present invention is performed as follows by means of the device described hereinabove. Measured values are recorded at a plurality of measurement points 22, which measurement points 22 are disposed transverse to the longitudinal direction at a distance apart from each other in the material of material strip 2. The material strip 2 is moved in the longitudinal direction relative to radiation sources 10 and 12 and to detectors 14 (14', 14", 14'") and 16 (16', 16", 16'"), and a row 26 of measured values substantially encompassing all measurement points 22 is recorded at each of several given intervals. Corresponding measurement points 22 of neighboring rows 26 of measured values then form longitudinal portions of the material strip to be examined for flatness in the longitudinal direction. Thereby there is obtained a grid of measurement points 22, which extends over material strip 2 as illustrated in FIGS. 4 and 6.

Figure 3A:
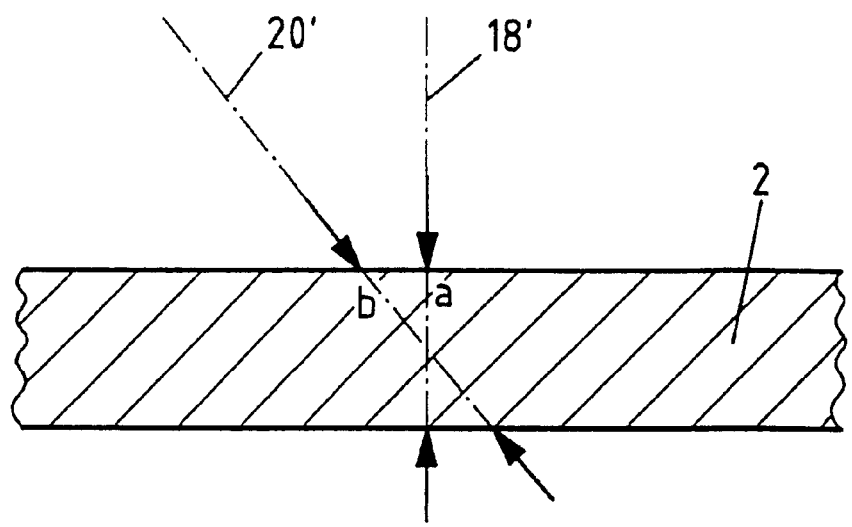
FIGS. 3a and 3b are schematic diagrams which show the beam path through the material strip in an enlarged view of a detail from FIG. 1 for various slopes of the material strip.
Figure 3B:
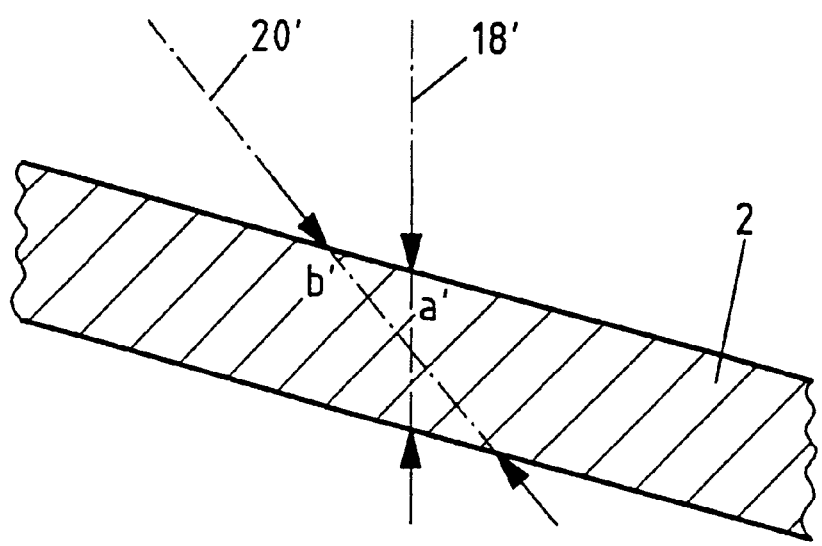

For each recorded measurement point 22, the slope of material strip 2 is calculated from the measured values of detectors pairs 14'–16', 14"–16", 14'"–16'". As illustrated in FIGS. 3a and 3b, different transit lengths of the radiation through material strip 2 are caused at equal solid angles, which are represented by axes 18' and 20', and at different slopes of material strip 2 relative to these solid angles. These transit lengths are marked as a, b and a', b' respectively with the arrows, and they lead within material strip 2 to different absorptions, which are expressed as different measured values of detectors 14' and 16'. From the known solid angles of axes 18' and 20' it is possible to calculate on the one hand the thickness and on the other hand the slope of material strip 2 as follows.

The two detectors 14 and 16 survey material strip 2 at known solid angles, which differ from one another. From the measured values recorded by detectors 14 and 16, then the orientation angle of the material strip, for example relative to the horizontal, is calculated by means of known geometric addition theorems. The slope can be derived from the orientation angle.

For successive rows of measured values, and knowing the relative velocity of material strip 2 in the longitudinal direction, the wavelength and phase of the changes of slopes are calculated by means of a Fourier transform. These changes characterize the flatness of material strip 2. This is illustrated schematically in FIGS. 4 and 6, in which a detail from material strip 2 is shown. The longitudinal direction in FIG. 4 extends vertically, and the individual rows 26 of measured values are illustrated as horizontal regions. These regions exhibit individual lines, which are aligned at particular angles and represent the slopes of the respective measurement points 22. They result in a characteristic pattern with light and dark regions, which represent raised and depressed portions of material strip 2. The distance between each two light or dark regions in FIG. 4 is a measure of the wavelength of the unevennesses.

In FIG. 6, on the other hand, the longitudinal direction extends from left to right, and the different slopes at individual measurement points 22 can be clearly distinguished in the three-dimensional representation, as can the extrema with the associated rows 28 of extreme measured values. It is emphasized that the diagram is highly schematic, inasmuch as the sequence of extrema is illustrated in the form of a regular sine curve. In material strips, however, the extrema caused by strip elongation occur irregularly. To consider them as a sinusoidal wave is therefore a highly simplified approximation.

Figure 5A:
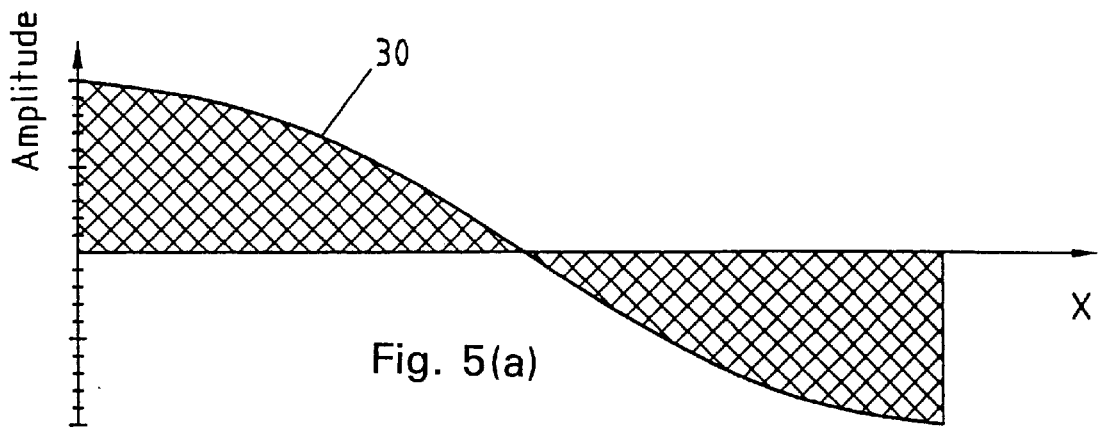
FIG. 5a is a graphic representation of the course of the slopes transverse to the longitudinal direction.
Figure 5B:
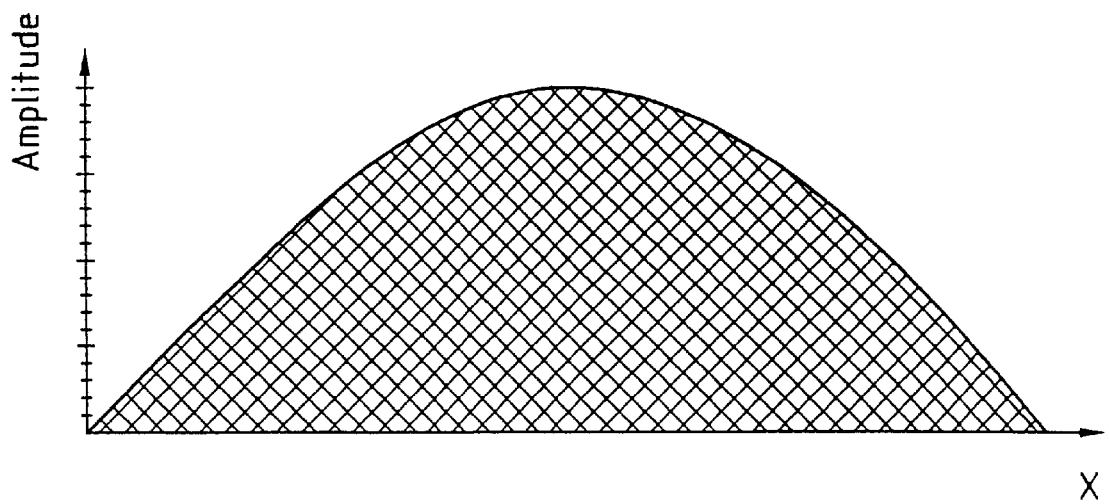
FIG. 5b is a graphic representation of the contour calculated by summing the slopes.

At least one extremum and the respective associated closest row 28 of extreme measured values are calculated from the wavelength and phase. Row 28 of extreme measured values is then characterized in that the slope values have substantially only a transverse component and thus can be used directly for calculation of the transverse contour. In this way the longitudinal and transverse components have been substantially resolved. A sequence of slope values transverse to the longitudinal direction is shown as envelope 30 of the area in FIG. 5a.

The amplitude of the unevenness for each measurement point 22 is then determined from the transverse contour. Finally, the strip elongation for each longitudinal portion of the material strip is obtained from the wavelength and amplitude.

To increase the accuracy of the evaluation, a plurality of measurement points can be combined in each of several measuring channels, for each of which a strip elongation is then calculated in the manner described hereinabove.

It will be appreciated that the instant specification is set forth by way of illustration and not limitation, and that various modifications and changes may be made without departing from the spirit and scope of the present invention.

What is claimed is:

1. A method for determining flatness of a material strip, the material strip predefining a longitudinal direction, comprising:

recording measured values at a plurality of measurement points by at least two radiation sources and a plurality of detectors, the measurement points being disposed transverse to the longitudinal direction and spaced apart from each other in the material of the strip and being sensed by at least two detectors, each detector detects radiation at various solid angles, moving the material strip in the longitudinal direction relative to the radiation sources and the detectors, and recording rows of measured values substantially encompassing all measurement points at each of several given intervals, calculating a slope of the material strip for each recorded measurement point from the measured values of detector pairs, calculating a wavelength and a phase of slope changes for successive rows of measured values at a known relative velocity in the longitudinal direction, calculating at least one extremum and the respective associated closest-row of extreme measured values from the wavelength and the phase, calculating a transverse contour by summing the slope values of the rows of extreme measured values; and then determining the amplitude of the transverse contour, and calculating an elongation of the material strip from the wavelength and the amplitude of the transverse contour.

2. The method according to claim 1, wherein the detectors measure a radiation intensity attenuated by the material strip.

3. The method according to claim 1, wherein the measurement points cover substantially the entire width of the material strip.

4. The method according to claim 1, wherein at least two of the measurement points are combined in measuring channels.

5. The method according to claim 4, wherein the measuring channels each encompass substantially the same number of measurement points.

6. The method according to claim 4, wherein the values of the slopes are calculated for each measuring channel.

7. The method according to claim 4, wherein a strip elongation is calculated for each measuring channel.

8. The method according to claim 1, wherein the wavelength and phase of the flatness are calculated by means of a Fourier transform.

9. The method according to claim 1, wherein the contour of the material strip in the region of the extremum is calculated from the data of the row of extreme measured values and of at least one further row of measured values.

10. The method according to claim 1, wherein the elongation of the material strip is calculated in I units by the $$\left(\frac{\text{Amplitude} \cdot \pi}{\text{Wavelength}}\right)^2 \cdot 10^5.$$

11. The method according to claim 1, wherein measured values for a first given strip length are recorded at a starting period of time for measuring, and the measured values are then evaluated.

12. The method according to claim 11, wherein after the first given strip length, the measured values for a smaller, second given strip length are recorded, and then the measured values most recently recorded over an entire first strip length are evaluated.

* * * * *